United States Patent
White

[15] 3,686,860
[45] Aug. 29, 1972

[54] NOZZLE CONTROL

[72] Inventor: Albert H. White, Wethersfield, Conn.

[73] Assignee: Chandler Evans Inc., West Hartford, Conn.

[22] Filed: Sept. 25, 1970

[21] Appl. No.: 75,401

Related U.S. Application Data

[62] Division of Ser. No. 825,857, May 19, 1969, Pat. No. 3,606,754.

[52] U.S. Cl..............................60/39.25, 60/39.16
[51] Int. Cl..............................................F02c 9/02
[58] Field of Search..........................60/39.25, 39.16

[56] References Cited

UNITED STATES PATENTS

| 3,579,992 | 5/1971 | Urban et al.............60/39.25 |
| 2,977,756 | 4/1961 | Stone......................60/39.28 |
| 3,350,880 | 11/1967 | McCombs................60/39.16 |
| 3,044,262 | 7/1962 | Chadwick et al.........60/39.16 |
| 3,523,423 | 8/1970 | Young......................60/39.16 |
| 3,508,395 | 4/1970 | Sebestyn..................60/39.16 |
| 3,529,419 | 9/1970 | Reed........................60/39.25 |

Primary Examiner—Carlton R. Croyle
Assistant Examiner—Warren Olsen
Attorney—Fishman and Van Kirk

[57] ABSTRACT

An inlet nozzle control for a regenerative gas turbine engine wherein a fuel metering valve and power turbine inlet nozzles are positioned in response to control signals provided by a closed loop system. Engine operating parameters, including gas generator turbine inlet temperature, are sensed and electrical signals commensurate therewith are delivered as inputs to logic circuitry where, in combination with selected operational mode inputs provided by the operator, they are operated upon to provide control signals for the power turbine nozzle actuators.

16 Claims, 6 Drawing Figures

FIG. 3

INVENTOR
ALBERT H. WHITE

BY FISHMAN & VAN KIRK
ATTORNEYS

NOZZLE CONTROL

CROSS-REFERENCE TO RELATED APPLICATIONS

This application is a division of application Ser. No. 825,857 filed May 19, 1969 now U.S. Pat No. 3,606,754 issued Sept. 21, 1971.

BACKGROUND OF THE INVENTION

1. Field of the Invention

The present invention relates to the control of gas turbine engines. More specifically, this invention is directed to a power turbine nozzle control for free turbine type engines with variable power turbine geometry. Accordingly, the general objects of the present invention are to provide novel and improved methods and apparatus of such character.

2. Description of the Prior Art

While not limited thereto in its utility, the present invention is particularly well suited for the control of regenerative gas turbine engines in the environment of a land vehicle. Regenerative gas turbine engines of the type proposed for powering highway vehicles are well known in the art and a number of schemes for exercising control over such engines have been proposed. Previous controls have largely been of the open loop, scheduling type wherein fuel flow to the engine was regulated, usually hydromechanically, to avoid either exceeding engine operating temperature limits or operation above the engine surge line. In order to provide safe operation, such scheduling controls, since they have not directly sensed and controlled gas generator turbine inlet temperature, have had to provide for a margin of safety which has resulted in operation substantially below the optimum operating temperature. As is well known, the operating efficiency of a gas turbine engine increases directly with turbine inlet temperature and substantial economies in fuel consumption may be achieved by operating a turbine engine with turbine inlet temperature at or near the maximum permissible value for a given set of operational conditions. Maximizing turbine inlet temperature would also permit faster engine acceleration.

In addition to the inherent deficiencies of open loop scheduling controls as discussed above, it is also to be noted that such controls are not suitable for economical operation of a turbine engine under steady state conditions. Restated, in addition to being unable to closely approach the optimum operating conditions for the engines, open loop scheduling type controls cannot compensate for the widely varying steady state turbine inlet temperatures that are experienced nor can open loop controls correct or compensate for deterioration of engine components, backlash in nozzle linkages and variation in engines gains.

It is further to be noted that, while electronic fuel controls have been proposed, the typical prior art control is a totally hydromechanical system. While such hydromechanical controls are highly reliable, they are comparatively inflexible and, due to the precise machining required, also comparatively expensive. Conversely, while providing manufacturing economies, previously proposed electronic controls have been lacking in reliability due, in part, to their complexity. This complexity of prior art electronic controls has been a direct result of the fact that such controls have been of the scheduling type.

SUMMARY OF THE INVENTION

The present invention overcomes thy above-discussed and numerous other disadvantages of the prior art and, in so doing, provides a closed loop control system. The present invention is a hybrid control in that it incorporates the desirable features of electronic logic with those of a hydromechanical control to provide a highly reliable and inexpensive turbine engine control system.

The control of the present invention includes electronic logic circuitry which is responsive to signals commensurate with measured engine operating parameters and signals commensurate with the desired operational mode as selected by an operator. The present invention also comprises a hydromechanical unit; which includes the main fuel metering valve, a fuel pump, a slug pump, a bypass regulator and associated sensors and control means. Electrical signals commensurate with fuel metering valve and power turbine nozzle position error are generated by the logic circuitry and delivered to the hydromechanical unit which, in turn, provides mechanical actuation of the valve and nozzle actuator as well as electrical feedback signals commensurate with actual nozzle actuator position and metering valve position. In addition to the position signals, the logic unit is also responsive to electrical signals provided by engine mounted sensors which generate signals commensurate with compressor inlet temperature, engine burner inlet temperature, gas generator turbine inlet temperature, compressor discharge pressure, gas generator speed and power turbine output shaft speed. The logic unit is also provided with signals commensurate with the operator's power lever (accelerator) angle and signals generated by the closing of various operator controlled switches. Accordingly, the intelligence and computing functions in the present invention are performed by electronic logic circuitry with two outputs; one operating in a hydromechanical fuel metering section and the other operating a hydromechanical turbine nozzle actuator. High pressure fuel for delivery to the engine, and for operation of the hydromechanical servo systems, will be supplied by an integrally mounted engine driven gear type fuel pump.

BRIEF DESCRIPTION OF THE DRAWING

The present invention may be better understood and its numerous objects and advantages will be come apparent to those skilled in the art by reference to the accompanying drawing wherein like reference numerals refer to like elements in the various figures and in which.

DESCRIPTION OF THE PREFERRED EMBODIMENTS

Figure 1:
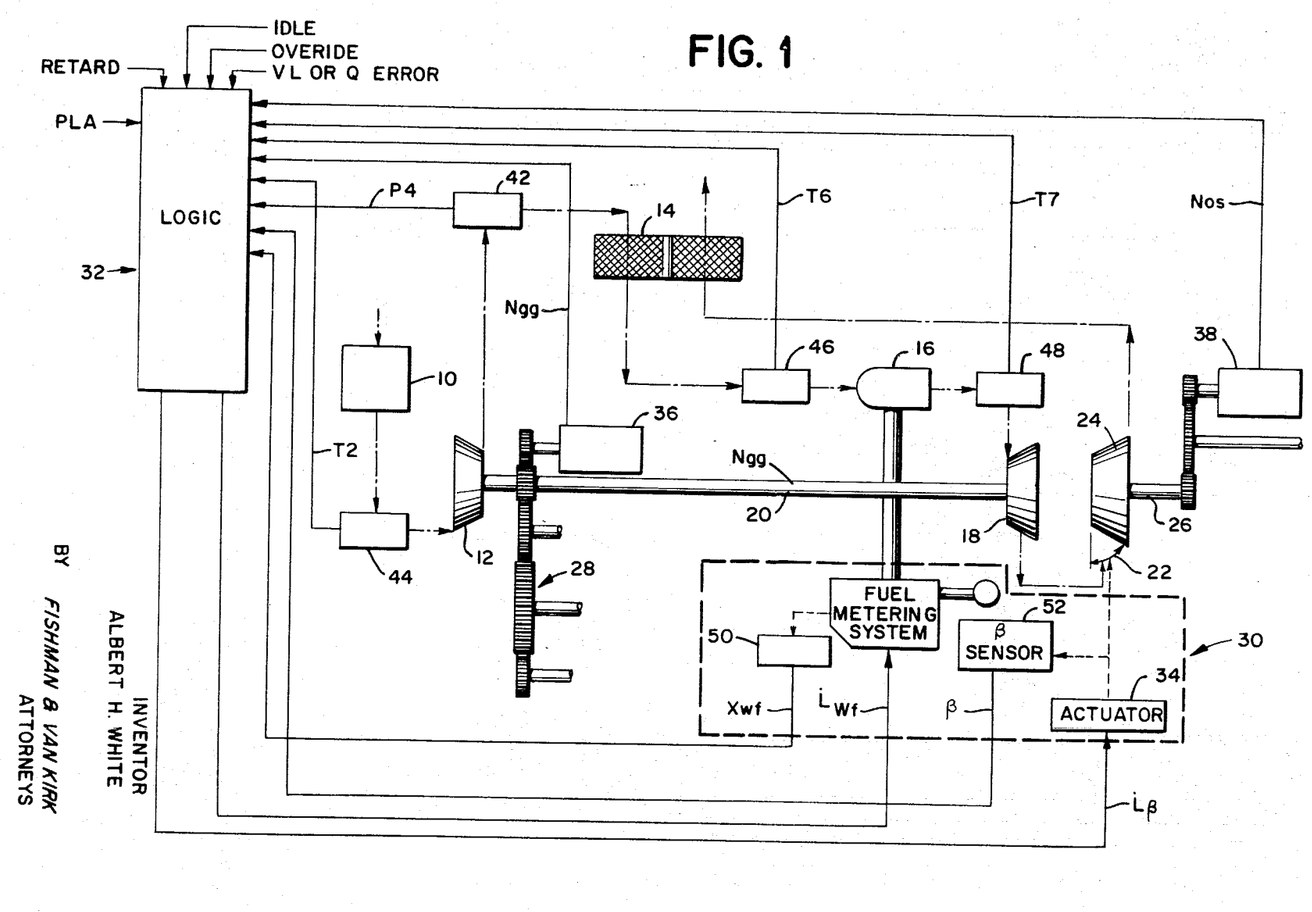
FIG. 1 is a schematic view of a regenerative gas turbine engine having the control system of the present invention associated therewith.

With reference now to FIG. 1, a regenerative gas turbine engine is depicted schematically. Ambient air enters the engine, passing through an airflow silencer 10, and is delivered to the gas generator compressor stage 12. Compressed air exiting from compressor 12 passes through a heat exchanger or regenerator 14 where it is preheated through heat exchange with the engine exhaust gases. The preheated air from regenerator 14 is delivered to the burner section 16 wherein it supports combustion of fuel in one or a plurality of burner cans. The hot combustion products from the burner section expand through the gas generator turbine 18 thereby driving the turbine and, via main rotor shaft 20, also driving compressor 12.

The gases generated by the combustion of fuel in the gas generator portion of the engine, after passing through turbine 18, flow through power turbine variable inlet nozzles 22 and thence to the power turbine 24. The power turbine 24 is a free turbine interposed in series fluid flow relation between the variable nozzle 22 and the regenerator 14, gases expanding through free turbine 24 being delivered to regenerator 14 for cooling before exhaust and for preheating the compressed air being delivered to the burner section 16. The engine output, in the form of shaft torque, is taken off the power turbine output shaft 26.

The components of the engine as described above are state of the art and do not comprise part of the present invention. Fuel is delivered under high pressure to the burner section 16 of the engine by a fuel pump which is connected through suitable gearing 28 to the gas generator rotor shaft 20. The engine starter will drive the gas generator turbine and compressor through the gearing 28 whereby the turbine and compressor will be set into rotation and fuel supplied to the engine upon starting, the starter thereafter being disconnected by suitable means, not shown.

The fuel pump drive will deliver mechanical power to a fuel pump in a hydromechanical portion, indicated generally at 30, of the control system of the present invention. Also delivered to hydromechanical control portion 30 will be an electrical signal commensurate with fuel metering valve position error as calculated by the electronic logic portion of the control system, indicated generally at 32. The logic unit will also provide an electrical control signal commensurate with power turbine inlet nozzle position error which is delivered to the actuator 34 for the variable power turbine nozzles 22.

In accordance with the present invention, a number of engine operating parameters are sensed, signals commensurate therewith generated and these signals supplied as inputs to the electronic logic unit 32. The parameters sensed in accordance with the present invention are as follows:

$N_{gg}$—gas generator speed
$N_{os}$—power turbine output shaft speed
$P_4$—gas generator compressor discharge pressure
$T_2$—gas generator compressor inlet temperature
$T_6$—gas generator burner stage inlet temperature
$T_7$—gas generator turbine inlet temperature
$X_\beta$—power turbine nozzle position In addition, a signal commensurate with the following fuel control condition is also provided to the logic unit:

$X_{wf}$—fuel metering valve position (commensurate with fuel flow $W_f$)

The controller or operator of the gas turbine engine will, directly or indirectly, cause electrical signals commensurate with the following desired operating parameters and conditions to also be delivered to logic unit 32:

PLA—power lever (accelerometer) angle = indicative of desired power turbine output shaft speed
retard—power turbine nozzle wide open bias idle-
low—gas generator speed set with parking brake on
idle-high—gas generator speed set with PLA less than X percent brake off
override—on or off The logic unit 32, in response to signals commensurate with the above-listed actual and desired operating parameters and conditions, will compute fuel metering valve position error and power turbine inlet nozzle position error and will generate and thereafter cause nulling of the following signals commensurate therewith:

$i_{wf}$—fuel metering valve position error
$i_\beta$—power turbine inlet nozzle position error The above-listed engine operating parameters are monitored by engine and hydromechanical fuel control portion mounted sensors which provide electrical output signals commensurate with the condition to which they are subjected. Thus, the gas generator speed is sensed by a magnetic pick up unit 36 (see FIG. 6) driven by gearing on the rotor shaft 20. The power turbine output shaft speed ($N_{os}$) sensor 38 will, like $N_{gg}$ sensor 36, be a magnetic speed sensor device driven from the power turbine output shaft 26 by suitable gearing.

In addition to magnetic speed sensor 36, a pressure responsive sensing device is also mounted in the gas generator portion of the engine. Thus, the $P_4$ sensor 42 is mounted in the vicinity of the inlet to regenerator 14.

The engine is also provided with three devices which are temperature responsive. The first of these devices is the $T_2$ sensor 44 which will typically be mounted on a probe inserted into the airstream at the inlet to compressor 12. A $T_6$ sensor 46 is positioned so as to measure the temperature of the preheated air intermediate regenerator 14 and burner section 16. The principal sensor of the present control comprises the gas generator turbine inlet temperature ($T_7$) sensor 48 which will typically be carried by a probe inserted in the airstream exiting from burner section 16.

The means for generating signals commensurate with fuel metering valve position $X_{wf}$, and power turbine inlet nozzle position $X_B$, respectively indicated at 50 and 52, will typically be potentiometers connected to a suitable source of potential and having their movable arms positioned by the respective valve and nozzle actuator drive output shafts. Similarly, the power lever angle signal will, considering a vehicle installation, also be generated by a potentiometer having its movable arm mechanically coupled to the accelerator pedal. As will be described in greater detail below, the retard and high and low idle bias signals will be provided by suitable switches and bias potential source connections.

Figure 2:
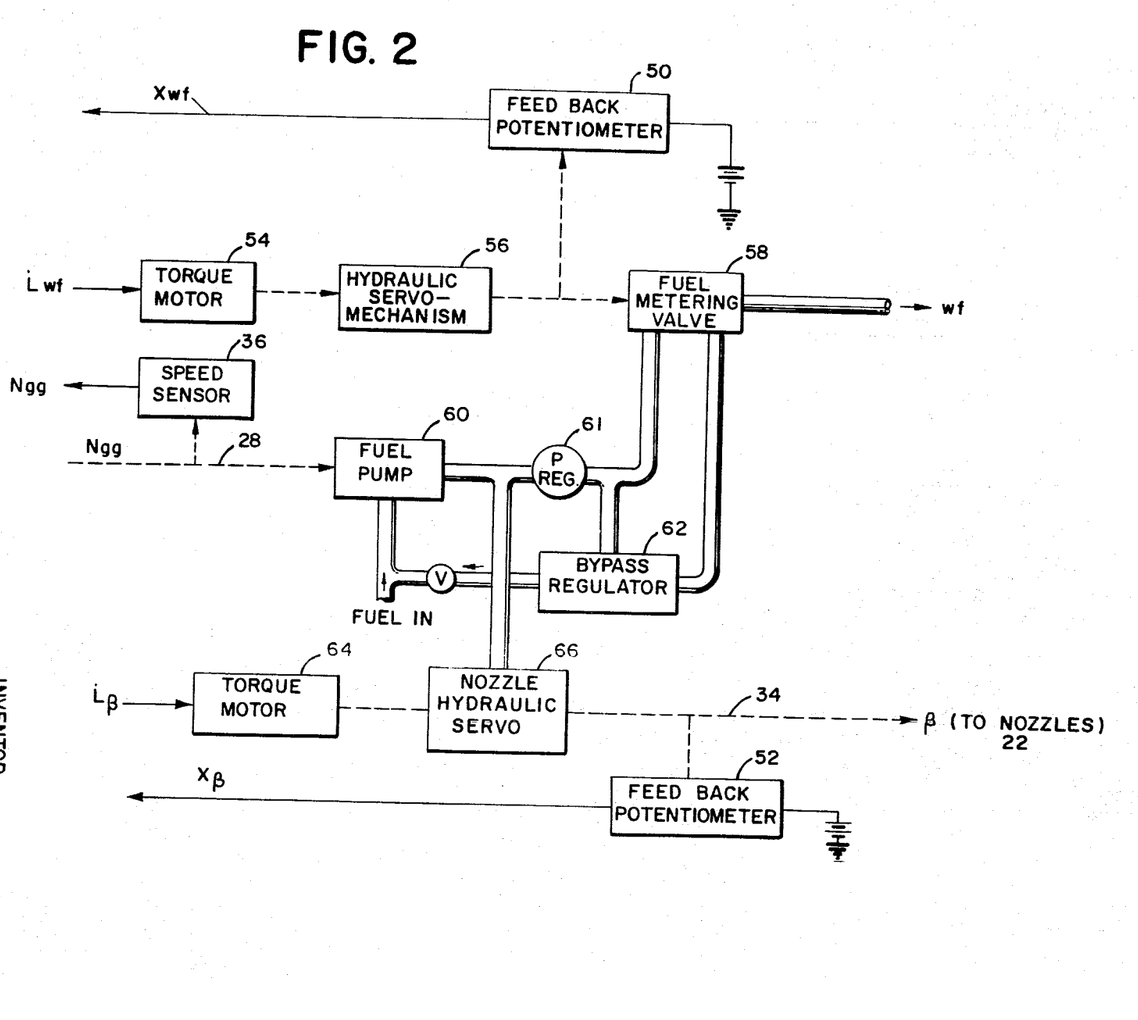
FIG. 2 is a block diagram of the hydromechanical portion of the hybrid control system of the present invention.

Referring now to FIG. 2, the hydromechanical portion of the hybrid control system of the present invention is shown in block form. The $i_{wf}$ signals provided by logic unit 32, and indicative of a computation that an adjustment of fuel flow is necessary to either maintain the desired operating conditions or to readjust to a new set of operating conditions as commanded by the operator, is delivered to an actuator device such as torque motor 54. The output shaft of torque motor 54 is mechanically coupled to a hydraulic servomechanism 56 which, in turn, is hydraulically coupled to the main fuel metering valve 58. Movements of the fuel metering valve will be sensed by sensor (potentiometer) 50 which generates the $X_{wf}$ signals which are fed back to logic unit 32.

Fuel under pressure is delivered to metering valve 58 by a fuel pump 60. As may best be seen from FIG. 6, the fuel pump will typically be a gear pump which is driven, via gearing 28, from the gas generator rotor shaft. As previously mentioned, the magnetic speed sensor 36 which provides the $N_{gg}$ signal for logic unit 32 is also driven from the gas generator rotor shaft and, in a typical installation, sensor 36 will comprise a portion of hydromechanical control portion 30. The fuel supply system also includes a pressurizing valve 61 and a bypass regulator 62 which is connected between the output and input of fuel pump 60.

The $i_\beta$ control signal for the power turbine nozzle actuators 34 is delivered from logic unit 32 to a second torque motor 64. The output shaft of motor 64 is mechanically coupled to a hydraulic servomechanism 66. The output of fuel pump 60 is also coupled to servomechanism 66, the high pressure fuel thus supplying power for turbine nozzle actuation. The servomechanism 66 is mechanically coupled, via actuator 34, to the nozzles 22 and the output shaft of servomechanism 66 also drives the movable arm of potentiometer-sensor 52 which provides the $X_\beta$ signal which is fed back to logic unit 32.

The present invention may be better understood by simultaneously considering the structure and operation of the logic unit 32. Thus, referring now to FIG. 3, a block diagram of the circuitry which comprises the fuel metering valve control portion of logic unit 32 will be considered. When the operator depresses his power lever (accelerator) a gas generator speed will be selected and a signal commensurate therewith generated. This PLA signal is provided by a function generator 68 which will typically be a potentiometer having its movable arm connected to the accelerator via suitable linkages. In a preferred embodiment, the potentiometer will be a linear wound device and the output schedule (voltage level) shown on the FIG. 3 will be provided by suitable linkages between the accelerator and potentiometer such that no output signal is generated in the idle range which comprises the first 15 percent of travel of the pedal.

Figure 3:
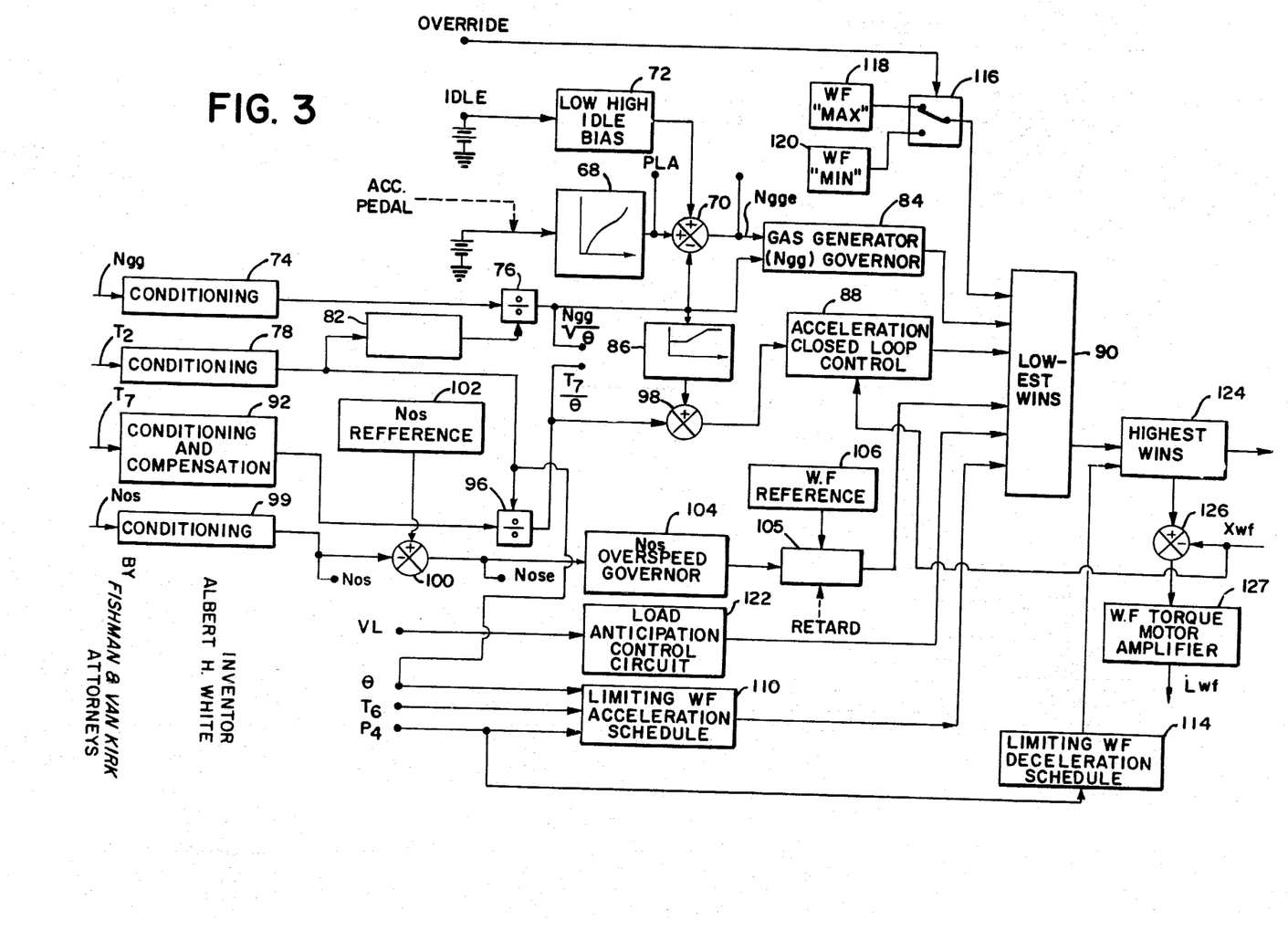
FIG. 3 is a block diagram of the fuel metering valve control signal generating subsystem of the electronic logic portion of the present invention.

The PLA signal provided by function generator 68 is summed, in summing circuit 70, with an idle bias signal provided by bias voltage source 72. Source 72 will comprise a voltage divider and switch arrangement whereby either a high or low idle bias will be applied to summing circuit 70. The low bias selector switch will typically be operatively connected to the parking brake and, with no output from function generator 68, will provide a signal which will result in closed loop control of $N_{gg}$ at 45 percent of maximum gas generator speed. When the parking brake is released, and before the accelerator pedal is depressed more than 15 percent of its range, bias source 72 will step to the high idle bias level whereby a control signal which will result in control of $N_{gg}$ at 55 percent of maximum speed will result.

Also applied to summing circuit 70, in opposition to the PLA and idle bias signals, will be a signal commensurate with actual $N_{gg}$. The actual gas generator speed signal, before application to summing circuit 70, will be modified in accordance with turbine inlet temperature, $T_2$. As is well known in the art, modification of the $N_{gg}$ signal in accordance with compressor inlet temperature is necessary to avoid surge. Thus, the signal provided by $N_{gg}$ sensor 36, which is a pulse train having a pulse repetition rate commensurate with rotor speed, will be passed through a conditioning circuit 74 wherein it is demodulated and amplified to provide a d.c. output level. This d.c. potential is thereafter applied to a divider circuit 76 wherein the modification for dependence on $T_2$ is accomplished to provide a corrected gas generator speed signal $N_{gg}/\sqrt{\theta}$.

The compensation signal $(1/\sqrt{\theta})$ is generated by applying the $T_2$ signal from sensor 44, after conditioning in an amplifier and impedance matching circuit 78, to a diode function generator 82. Function generator 82 corrects $T_2$ to standard sea level conditions, where it increases linearly for all practical purposes, and takes the square root thereof. Thus, the output of circuit 82 is $\sqrt{\theta}$, where $\theta$ is $T_2/519$.

As previously noted, the modified gas generator speed signal is applied to summing circuit 70 whereby a gas generator speed error signal, $N_{gge}$, will be generated and applied to the gas generator governor circuit 84. The temperature compensated gas generator speed signal will also be applied directly to governor 84. Governor 84 will function as a conventional proportional governor system with lead compensation. Thus, the governor 84 may comprise an operational amplifier connected as a driver amplifier with lead compensation. Lead compensation, while not being mandatory, is considered desirable in the interest of stability since the amplifier should have high gain to minimize variations in speed over the gas generator operating range. A multiplier or similar circuitry will be incorporated in the feedback loop of the amplifier which comprises governor 84 to vary the amplifier gain with $N_{gg}$ (corrected for $T_2$). This gain variation is desirable since the engine time constant varies with speed (i.e., is a function of spool inertia). The output of governor 84 will be an $i_{wf}$ signal which may be applied to torque motor 54 to cause repositioning of the fuel metering valve 58.

For the purposes to be described below, the temperature compensated gas generator speed signal ($N_{gg}/\sqrt{\theta}$) is also applied to a diode function generator 86.

As previously mentioned, the system of the present invention primarily controls loop closed on gas generator turbine inlet temperature $T_7$. The actual value of $T_7$ is measured by sensor 48 which will typically be a thermo-couple. The $T_7$ signal from sensor 48 is applied to a conditioning and compensation circuit 92 which provides cold junction compensation. Compensation circuit 92 also comprises means for amplifying the $T_7$ signal, the amplifying means incorporating a phase advance circuit to compensate for thermo-couple time constant.

Since the permissible limit of $T_7$ varies with the gas generator inlet conditions, $T_2$ compensation of the $T_7$ signal is desirable. Accordingly, the $T_2$ signal from conditioning circuit 78 will, along with the $T_7$ signal from circuit 92, be applied to division circuit 96. The output of circuit 96 will thus be a $T_7/\theta$ signal commensurate with turbine inlet temperature as compensated for gas generator inlet temperature.

The compensated $T_7$ signal from division circuit 96 will be applied to a summing amplifier 98 wherein it will be compared to the output of aforementioned diode function generator 86. Function generator 86 has, as noted above, the compensated gas generator speed signal applied as its input. The output of function generator 86 will be a $T_7$ reference signal which varies with the corrected gas generator speed. This $T_7$ reference signal will be commensurate with the maximum value of $T_7$, as a function of the instantaneous value of the temperature compensated gas generator speed, which is permissible during an acceleration. The $T_7$ maximum reference signal from function generator 86 is thus compared with the actual $T_7$ signal in summing amplifier 98 to generate an error signal which is processed in acceleration control 88. Control 88 comprises a proportional amplifier with lead compensation. Control 88 is also supplied with rate feedback whereby the output of the fuel metering valve position sensor 50 will be capacitively coupled to the amplifier input to provide dynamic compensation. The rate feedback from the metering valve prevents transient overtemperatures by limiting the control signal generated by control 88. The acceleration control $i_{wf}$ signals from circuit 88 are also applied to selector circuit 90.

Selector circuit 90 may comprise a diode selector circuit which will pass the lowest of a plurality of inputs applied thereto. As described above, circuit 90 has applied thereto fuel metering valve control signals from governor 84 and acceleration control 88. Under normal idle or steady state cruise conditions, a signal from governor 84 will be passed by circuit 90. However, under acceleration conditions, unless less fuel flow is called for by another circuit, the signal from acceleration control 88 will be passed by circuit 90 and the engine will accelerate at the maximum rate permissible taking $T_7$ into consideration.

In accordance with the present invention, means are included which provide a safety factor and permit engine operation should there be a component failure in the prime control circuit. Thus, in order to guard against power turbine overspeed, the $N_{os}$ signal from sensor 38 is, after demodulation in conditioning circuit 99, applied to a summing circuit 100 wherein it is compared with a reference signal from source 102 commensurate with maximum permissible power turbine speed. Should the power turbine exceed its maximum rated speed, an $N_{ose}$ error signal will appear at the output of summing circuit 100. This power turbine speed error signal will be applied to an $N_{os}$ overspeed governor 104 which amplifies the error signal and provides an output which will reduce fuel flow as necessary to protect against overspeed. The output of governor amplifier circuit 104 is applied to selector circuit 90 via a switch 105. Switch 105 is mechanically coupled to the retard pedal and thus is operated to isolate governor 104 from selector 90 when the operator calls for retard operation. In retard operation the gas generator must deliver substantial power and thus a reference voltage source 106 is also connected to switch 105. Upon closing of the switch, the output of source 106 will be applied to circuit 90 and this output will be sufficiently high to insure that retard power is generated unless smaller fuel flow is called for by another control loop.

The $T_2$ compensation signal ($\theta$) from conditioning circuit 78 and the $T_6$ and $P_4$ signals, respectively provided by sensors 46 and 42, are applied to a scheduling circuit 110. Circuit 110 is a scheduling type control. That is, circuit 110 is an electronic function generator which generates a maximum fuel flow limit as a function of $T_6$ and $P_4$; these inputs being modified for dependence on $T_2$. Thus, circuit 110 is an open loop scheduling device which provides an output signal at a level calling for fuel flow in excess of that commanded by closed loop control circuit 88 under normal conditions. In its most basic form, circuit 110 may be merely a multiplier circuit. The output of circuit 110 is applied to selector circuit 90 but, since the gain of circuit 110 is chosen such that under normal conditions it will always call for fuel flow in excess of that commanded by the other control loops, circuit 110 will not take over command of the fuel metering system unless there is a component failure, and particularly a failure of the $T_7$ sensor.

An override signal will also be applied to selector circuit 90 if, for any reason, the operator wishes to disable the open or closed loop control circuits. In such an instance, the switch 116 will be closed by the operator so as to disconnect a $W_f$ "max." signal, as provided by bias source 118, from selector circuit 90. Simultaneously a $W_f$ "min." signal provided by bias source 120 will be connected to selector circuit 90. The $W_f$ "max." bias is sufficiently high to prevent the override from assuming control under normal operating conditions. The $W_f$ "min." signal will call for approximately idle fuel flow or will drive the system to the decelerate schedule as will be described below. The override switch 116 would be operated only in case of emergency such as, for example, a power lever (accelerator) linkage break.

An additional input to selector circuit 90 may be from a load anticipation circuit 122. It is to be noted that load anticipation circuit 122 will be employed only in static installations where the engine is intended to power apparatus such as an electrical power generator. Thus, in the environment of a vehicle, circuit 122 will be omitted. Circuit 122 will provide signals indicative of a change in the load on the power turbine and will comprise an amplifier and lead-lag circuit. Thus, if the electrical load on a generator connected to power turbine output shaft 26 is changed, circuit 122 will provide a fuel flow change command to selector circuit 90 before the power turbine can react to the load change.

As previously noted, the signal calling for the least fuel flow will be passed by selector circuit 90. This "lowest wins" signal will thereafter be applied to a second selector circuit 124. Also applied to selector circuit 124 will be the signal from deceleration schedule circuit 114. Circuit 124 will select the input signal thereto calling for the greatest fuel flow and thus will prevent flameout caused by large $N_{gge}$ error signal commands from governor 84. Circuit 124 will be either a diode function generator or an amplifier which provides an output signal proportional to $P_4$. It is especially to be noted that the output of circuit 124 will always be sufficient to insure that the fuel control will never deliver less fuel than that needed to maintain combustion.

The output signal from selector circuit 124 will be applied to a summing circuit 126 wherein it is compared to the feedback signal generated by feedback potentiometer 50. The output of summing circuit 126 will thus be a position error signal which is applied to torque motor 54 so as to cause repositioning of fuel metering valve 58 in the proper direction.

Figure 4:
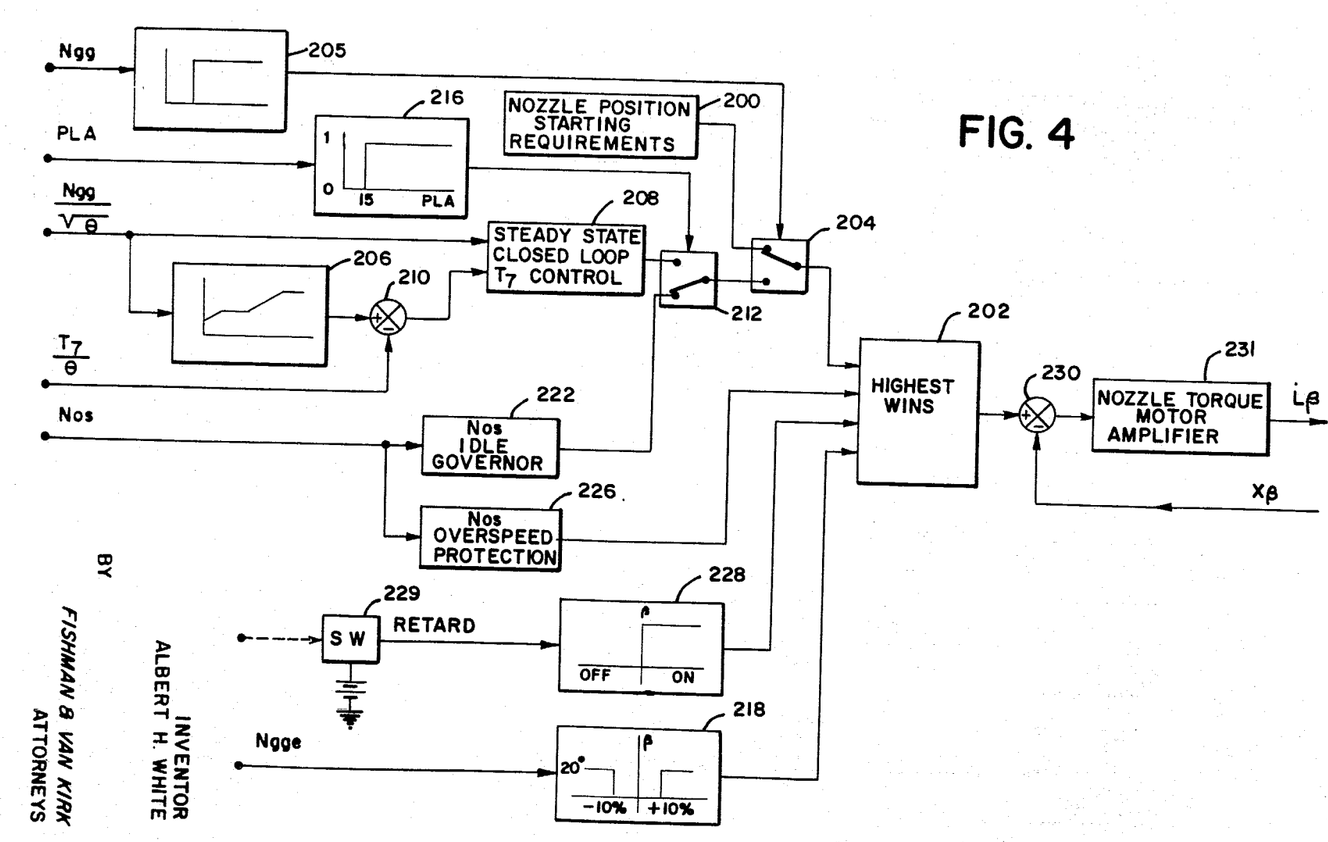
FIG. 4 is a block diagram of the power turbine nozzle actuator control generating subsystem of the electronic logic portion of the present invention.

Referring now to FIG. 4, a first embodiment of a power turbine nozzle control circuit is shown in block form. The inputs to the nozzle control of FIG. 4 comprise the $N_{gg}$ signal provided by conditioning circuit 74, the PLA signal from function generator 68, the temperature compensated $N_{gg}$ signal from division circuit 76, the temperature compensated $T_7$ signal from division circuit 96, the $N_{os}$ signal from conditioning circuit 99, the $N_{gge}$ signal from summing circuit 70 and a retard command signal which will be generated by the closing of an operator controlled switch. It is to be noted that the power turbine nozzles have, in addition to the normal or steady state position, which will be computed and commanded by the present invention, three discrete positions. These three discrete positions are start, acceleration and deceleration and retard. Thus, considering first the start position, a starting position bias signal will be provided by bias voltage source 200 and will be delivered to a selector circuit 202 via a switching circuit 204. Switching circuit 204 is, in turn, controlled in response to gas generator speed by a voltage sensitive bistable circuit 205 whereby the starting bias signal from source 200 will be applied to selector 202 only when the gas generator speed is less than a preselected percentage, typically 40 percent, of its normal operating speed. At other times the nozzle position control signal, as computed by the closed loop $T_7$ control system in the manner to be described below, will be applied via switch 204 to selector circuit 202.

The temperature compensated gas generator speed signal is applied to a function generator 206 and also to a proportional plus integral control circuit 208. Function generator 206 may, for example, comprise the same circuitry as function generator 86 or, in fact, may actually be function generator 86. That is, the output of generator 206 will be the same as that of circuit 86 with the exception that the generator 206 output will be biased upwards by 100° F. Thus, generator 206 provides an output signal commensurate with corrected gas generator speed as a function of $T_7/\theta$. This signal is applied to a summing circuit 210 where it is compared with the actual corrected turbine inlet temperature signal to generate a $T_7$ error signal. The signal from summing circuit 210, as well as the temperature compensated gas generator speed signal, is applied to control circuit 208. Control circuit 208 may, for example, comprise a proportional plus integral control with lead compensation as a function of gas generator speed so as to allow for variations in engine time constant.

The output from control circuit 208 is applied to a switching circuit 212. Switching circuit 212 is controlled, through the action of voltage sensitive bistable circuit 216, by the operator's power lever. Accordingly, the output of control circuit 208 will be applied, via series connected switches 212 and 204, to selector circuit 202 only when the gas generator speed is greater than the preselected value (40 percent) and the operator's power lever is depressed more than 15 percent. Otherwise, for example when operating under idle bias control, the power turbine inlet nozzles will be closed loop controlled to hold $N_{os}$ at a preselected level; typically 750 r.p.m. in the manner to be described below. Obviously, when under steady state $T_7$ control, if the temperature corrected $T_7$ signal is equal to the economy schedule (the reference signal from function generator 206), there will be an output provided by control circuit 208 which will cause the nozzle actuator to maintain the nozzle position.

During accelerations or decelerations involving a change in $N_{gg}$ exceeding 10 percent, control action will revert from closed loop control on turbine inlet temperature to nozzle position. That is, speed errors greater than 10 percent indicate operation in a transient mode; either engine acceleration or deceleration. Upon occurrence of a gas generator speed error ($N_{gge}$) in excess of 10 percent, a bias signal, as provided by switching circuit 218 and associated reference voltage source, will be applied to selector circuit 202. Under these conditions, the nozzle will be controlled to the position appropriate to transient operation; i.e., to the discrete acceleration and deceleration position as commanded by the output level of source 218.

It is also to be noted that, with the power level angle in the idle range, and presuming that the gas generator has at least attained its idling speed or is within 10 percent thereof, a signal from $N_{os}$ idle governor 222 will be applied to selector circuit 202 via switches 212 and 204. The input to idle governor 222 is the $N_{os}$ signal from signal conditioning circuit 99. Idle governor 222 may, for example, comprise a further summing amplifier which provides proportional control. Thus, governor 222 will provide an output signal to cause the power turbine nozzles to close to the point where the power turbine will idle at a preselected speed, typically 750 r.p.m.

The power turbine output shaft speed signal is also applied to an overspeed protection circuit 226. Overspeed protection circuit 226 will function in the same manner as the overspeed governor 104 of FIG. 3 and will provide a steady state high level bias signal to selector circuit 202 under overspeed conditions whereby the power turbine nozzles will be operated in the proper direction to prevent the overspeed.

A further input to selector circuit 202 is provided by a retard circuit 228. A retard pedal is provided for the operator and, when this pedal is depressed, a switch 229 will be closed and circuit 228 will provide a high level steady state signal which will be passed by selector circuit 202 and will cause the nozzles to move immediately to the retard position. In the retard position, the nozzles are adjusted so as to provide braking.

A previously noted, the largest signal applied to selector circuit 202, which will typically comprise a diode gating circuit, will be passed and applied to a summing circuit 230. Also applied to summing circuit 230 is the $X_\beta$ feedback signal as derived by feedback potentiometer 52. Summation of the nozzle position feedback signal and the nozzle position command signal will cause generation of a nozzle position error signal which is applied to the nozzle position actuator torque motor 64.

To summarize the nozzle control of the FIG. 4 embodiment, below a corrected and preselected gas generator speed, the nozzles are set to the "start" position with the nozzle position control signal being provided by bias source 200. Above this preselected speed, one of three automatic control loops is responsible for positioning the nozzle. During steady state cruise, the nozzles are positioned to run on an economy fuel schedule and deviations from this schedule are applied as error signals to the input of the proportional plus integral $T_7$ control loop 208. During accelerations and decelerations, nozzle position control reverts to a position loop and the nozzles are controlled to a discrete position as commanded by the output of function generator 218. Under idling conditions, nozzle position control reverts to idling governor 222. It is to be noted that the $T_7$ control loop is integral acting and therefore operates without droop.

The nozzle control of FIG. 4 may be overriden by either the operation of the retard switch 229, whereby the bias potential from source 228 is applied to the torque motor summing amplifier 230, or by the overspeed protection circuit 226. Whichever control parameter is in command, selector circuit 202 will pass a signal which calls for the nozzles to move the greatest distance toward the retard position.

Figure 5:
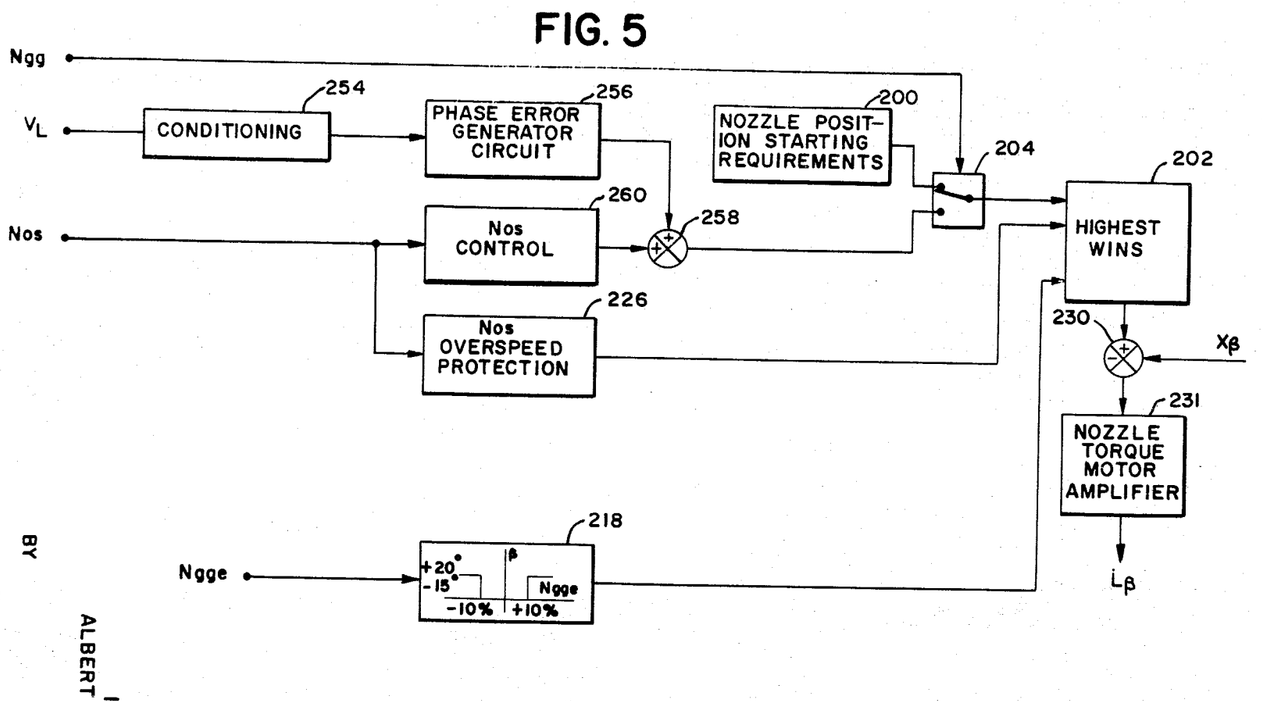
FIG. 5 is a block diagram of an alternate nozzle control signal generating subsystem to that shown in FIG. 5, the embodiment of FIG. 5 being intended for use in a stationary engine installation.

In a static environment the nozzle position control may, as will be seen from a consideration of FIG. 5, be simplified. Thus, when employed on a variable geometry free turbine engine utilized to drive an electrical generator, instead of controlling steady state on $T_7$ the present invention will control on $N_{os}$. Accordingly, the power turbine speed signal from conditioning circuit 99 will be applied to an ischronous governor 260 and to the overspeed protection circuit 226. Governor 260 will comprise a conventional ischronous control having dead band compensation.

The output of governor 260 will be applied to summing amplifier 258. Also applied to summing circuit 258 will be the output of a phase error generator circuit 256. Circuit 256 receives signals commensurate with the load on the electrical generator after conditioning in circuit 254. In response to the load signals applied thereto, circuit 256 provides phase angle and load anticipation signals which are added to the speed error signals from control 260. The computation of phase angle error allows use of the present invention in multiple generator installations where load sharing is desired.

Figure 6:
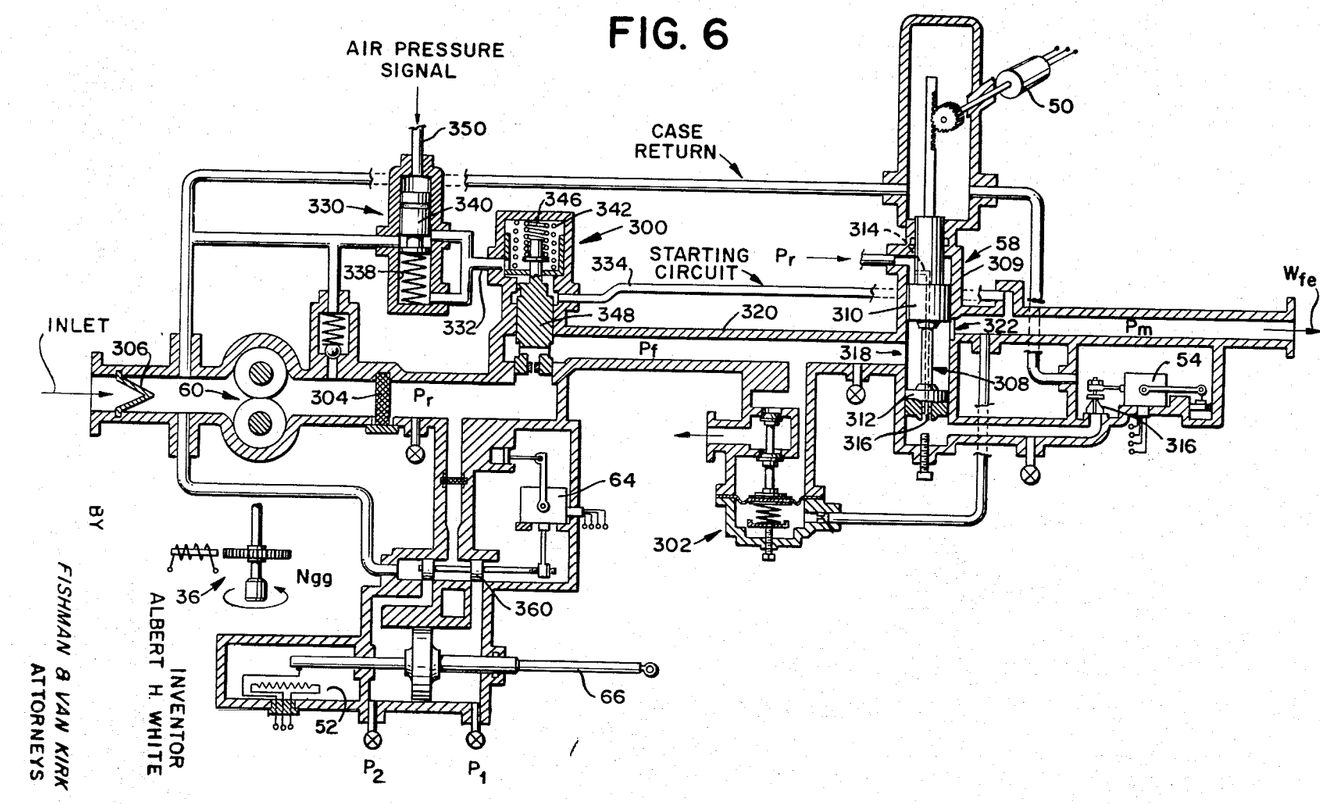
FIG. 6 is a schematic view of the subsystem shown in FIG. 2.

Considering now FIG. 6, the hydromechanical portion of the control, as shown in block diagram form in FIG. 2, is shown schematically. The apparatus of FIG. 6 comprises a gear type fuel pump 60 with associated filters and a fuel metering system including the metering valve, indicated generally at 58; a pressurizing valve 300; a metering head or bypass regulator, indicated generally at 302; and a start flow circuit. The hydromechanical portion also includes the turbine nozzle servomechanism and nozzle actuator, the nozzle and metering valve position sensors and the $N_{og}$ speed sensor.

The fuel pump 60 supplies high pressure fuel for engine operation, metering valve servo operation and turbine nozzle servomechanism actuation. A barrier filter 304 is located downstream of the pump to remove large particle contamination which may enter the control through the supply line and also to remove pump generated contamination. An inlet filter 306 is located upstream of pump 60.

The fuel metering system consists of a main fuel metering valve 58 and a pressure regulation device which comprises pressure regulator valve 300 and bypass regulator 302 and associated restrictors. The system functions in such a manner that the major component of the fuel flow metered to the engine is that passing through the metering valve 58. The flow through the metering valve is set by the metering valve opening, a flow constant and the pressure drop across the metering valve. At any given altitude the metering head regulator 302 maintains the pressure drop constant. The metered flow to the engine is therefore set by the metering valve opening and the pressure drop across the valve.

The main metering valve 58 comprises a half-area servo system having a spool or servo piston 308. Spool 308 is mounted in a housing 310 and includes first and second spaced lands, respectively indicated at 310 and 312. A bore 314, containing a restriction 316, passes through the spool to communicate fuel, at a regulated pressure, from the outboard face of first land 310, to the outboard face of second land 312. The pressure of the thus communicated fuel adjacent outboard face of second land 312, and thus the position of spool 308 is controlled by torque motor 54 and its associated flapper valve 316. An inlet port 318, located intermediate the lands on spool 308, admits fuel from a segment of main fuel supply line 320. The thus admitted fuel is delivered to the burner section of the engine via an outlet port 322 in housing 310. Outlet port 322 will be partially covered by first land 310 of spool 308. The metering valve position sensor potentiometer 50 generates the $X_{wf}$ signal which is fed back to the logic unit 32. The movable arm on potentiometer 50 is mechanically coupled to and thus positioned by spool 308.

Valve 316 is positioned by torque motor 54 in accordance with fuel flow command signals provided by the logic circuitry of FIG. 3. Thus, the electronic control system schedules a metering valve position, compares this position with the actual metering valve position as provided by potentiometer 50, and the error signal is fed into the flapper valve actuator torque motor 54. Torque motor 54 thereupon varies the position of flapper valve 316 so as to unbalance the pressure across spool 308. The pressure unbalance causes the spool to move and cancel out the error signal. The metering valve of the present invention, which comprises both the half-area, flapper servo system and the valve position feedback element is described in more detail in U.S. Pat. No. 3,606,754 issued Sept. 21, 1971, and assigned to the same assignee as the present invention.

The pressurizing valve 300 is a spring loaded valve which maintains a minimum pressure, typically 150 psi, above pump inlet pressure so as to insure adequate pressure for operation of the metering valve servo 56 and the power turbine nozzle actuator. The pressurizing valve 300 also shuts off a novel fuel slug circuit after the engine has been started and the control of the present invention starts metering fuel to the engine.

Considering now the starting circuit, a slug pump 330 and pressurizing valve 300 are interconnected by a conduit 332. When in the "start" position, pressurizing valve 300 provides communication between conduit 332 and a downstream conduit 334. The pressurizing valve 300 also interconnects two segments of the main fuel supply line downstream of filter 304 for providing a regulated pressure in segment 320. The slug pump 330 is used during starting to inject an initial burst of fuel into the engine. Slug pump 330 comprises a chamber 338 and a spring biased piston 340.

The pressurizing valve has a pair of coaxial springs 342 and 346 which bias a piston 348. Piston 348 is exposed to the unregulated pressure in the main fuel supply line. Spring 346 biases piston 348 only after it has moved to a predetermined position while spring 342 is always in operation. When the pressure in the main fuel supply line reaches a predetermined level, piston 348 moves against the bias of spring 342 to close off the starting circuit by interrupting the communication between conduits 332 and 334. As pressure continues to increase, the action of spring 346 will result in regulation of the pressure in fuel supply line segment 320.

To insure easy starting, it is necessary to purge the fuel lines as early as possible during the starting sequence. In the present invention, this is accomplished by supplying boost pressure, via conduit 334, to the engine burner section. Thus when the gear pump 60 is at rest, fuel from a boost pump (not shown) will be injected into the chamber 338 of slug pump 330 of the starting circuit. The gear pump acts as a check valve when the gears thereof are not turning and the fuel delivered by the boost pump will accordingly not pass through the main fuel line. Just prior to or simultaneous with ignition, an air pressure signal, generated by any suitable means and delivered to the slug pump via conduit 350, will cause displacement of the piston 340 of slug pump 330. Movement of the slug pump piston will cause a burst of fuel to be injected into the burner thus facilitating engine ignition. As noted above, when the accumulated fuel is discharged from the slug pump, the piston 348 of pressurizing valve 300 will, considering FIG. 6, be at its extreme lower limit of downward travel.

After ignition, the gas generator rotor shaft will commence rotating on its own, initial rotation being under the action of the starter. Rotation of the gas generator shaft will drive gear pump 60 thereby causing a flow in the main fuel supply line. Fuel will then flow through pressure regulating valve 300 and be delivered to main metering valve 58 and thence to the engine. The pressure in the main fuel supply line will increase with increases in engine speed, normal operation of the pressurizing valve will occur and the piston 348 of valve 300 will move upwardly to a position which will completely close off the starting circuit.

It is to be noted that the piston type slug pump depicted in FIG. 6 may be replaced by a diaphragm type pump or a small electric motor and pump. It is also to be noted that the structure and operation of pressurizing valve 300 and slug pump 330 are more fully described in an application entitled "Slug Pump and Pressurizing Valve for Fuel Control Sysem" filed May 19, 1969 and assigned U.S. Ser. No. 825,818, now U.S. Pat. No. 3,593,736 issued July 20, 1971, and assigned to the same assignee as the present invention.

In accordance with the present invention, the power turbine nozzle actuator 66 is operated hydraulically and is controlled by a spool valve 360 which is, in turn, positioned by torque motor 64. Actuator 66 also positions the movable arm on a potentiometer 52 to provide the required electrical position feedback signal $X_\beta$.

While a preferred embodiment has been shown and described, various modifications and substitutions may be made without departing from the spirit and scope of this invention. Accordingly, it is to be understood that this invention has been described by way of illustration and not limitation.

What is claimed is:

1. A nozzle control for a variable geometry gas turbine engine, said engine having a gas generator section with a variable area exhaust nozzle, said control comprising:
    means for varying the geometry of said nozzle, said nozzle geometry varying means operating in response to nozzle position error signals;
    means for sensing a first engine gas generator operating parameter and for generating a signal commensurate therewith;
    means for sensing a second engine gas generator operating parameter and for generating a signal commensurate therewith;
    means responsive to said signals commensurate with sensed engine gas generator operating parameters for generating signals commensurate with the desired steady state nozzle geometry;
    means for generating signals commensurate with a preselected nozzle geometry desired during engine acceleration and deceleration;
    means for selectively generating signals commensurate with the desired nozzle geometry during retard operation;
    means responsive to said steady state, retard and acceleration and deceleration desired nozzle geometry signals for selecting and passing the signal which calls for nozzle geometry closest to retard geometry;
    means for sensing actual nozzle geometry and for generating a signal commensurate therewith; and
    means responsive to said actual and selected desired nozzle geometry signals for generating nozzle geometry error signals for application to said nozzle geometry varying means.

2. A nozzle control for a variable geometry free turbine engine, said engine having a variable area power turbine inlet nozzle and a gas generator section, said control comprising:

means for varying the area of said nozzle, said nozzle area varying means operating in response to nozzle area error signals;

means for sensing the turbine inlet temperature of said engine gas generator and for generating a signal commensurate therewith;

means for sensing the speed of said engine gas generator and for generating a signal commensurate therewith;

means responsive to said turbine inlet temperature and gas generator speed signals for generating a first steady state nozzle area signal;

means for sensing engine power turbine speed and for generating a signal commensurate therewith;

means responsive to said signal commensurate with power turbine speed for generating a second steady state nozzle area signal;

means for generating signals commensurate with desired gas generator speed;

means for sensing actual nozzle area and for generating a signal commensurate therewith;

means responsive to said actual and a generated steady state nozzle area signal for generating nozzle area error signals for application to said nozzle area varying means; and means responsive to said desired gas generator speed signals for selectively applying said first and second steady state nozzle area signals to said area error signal generating means.

3. The apparatus of claim 2 wherein said nozzle area error signal generating means further comprises:

means for generating signals commensurate with the desired nozzle area during acceleration and deceleration;

means for selectively generating signals commensurate with the desired nozzle area during retard operation; and means responsive to said selected steady state, retard and acceleration and deceleration desired nozzle area signals for passing the signal which calls for nozzle area closest to retard area to said position error signal generating means.

4. The apparatus of claim 1 wherein said nozzle geometry varying means comprises:

a hydraulic servomechanism;

a nozzle actuator connected to and operated by said servomechanism; and electrically operated valve means for controlling said servomechanism in response to nozzle geometry error signals.

5. The apparatus of claim 3 wherein said nozzle area varying means comprises:

a hydraulic servomechanism;

a nozzle actuator connected to and operated by said servomechanism; and electrically operated valve means for controlling said servomechanism in response to nozzle area error signals.

6. A fuel control for a variable geometry free turbine engine, said engine having a variable power turbine nozzle and a gas generator section, said control comprising:

a fuel metering valve for regulating the rate at which fuel is delivered to the engine;

valve adjusting means coupled to said metering valve, said adjusting means being responsive to fuel flow error signals supplied thereto;

means for sensing the turbine inlet temperature of said engine gas generator and for generating a signal commensurate therewith;

means for sensing the speed of said engine gas generator and for generating a signal commensurate therewith;

means responsive to said signals commensurate with speed and temperature for generating a first signal commensurate with desired fuel flow;

means for generating a signal commensurate with the desired gas generator speed;

means responsive to said actual and desired speed signals for generating a second signal commensurate with desired fuel flow;

selector means responsive to said first and second fuel flow signals for passing the signal calling for the least fuel flow to said valve adjusting means;

means for varying the position of said nozzle, said nozzle position varying means operating in response to nozzle position error signals; and means responsive to said signals commensurate with speed and temperature for generating nozzle position error signals for application to said position varying means.

7. The apparatus of claim 6 wherein said means for generating nozzle position error signals comprises:

means responsive to said signals commensurate with turbine inlet temperature and gas generator speed for generating signals commensurate with desired steady state nozzle position;

means for sensing actual nozzle position and for generating a signal commensurate therewith; and means responsive to said actual and desired nozzle position signals for generating nozzle position error signals for application to said position varying means.

8. The apparatus of claim 7 wherein said nozzle position error signal generating means further comprises:

means for generating signals commensurate with the desired nozzle position during acceleration and deceleration;

means for selectively generating signals commensurate with the desired nozzle position during retard operation; and means responsive to said steady state, retard and acceleration and deceleration desired nozzle position signals for passing the signal which calls for nozzle position closest to retard position to said position error signal generating means.

9. The apparatus of claim 7 wherein said means for generating desired nozzle steady state position signals comprises:

means responsive to said turbine inlet temperature and gas generator speed signals for generating a first steady state nozzle position signal;

means for sensing engine power turbine speed and for generating a signal commensurate therewith;

means responsive to said signal commensurate with power turbine speed for generating a second steady state nozzle position signal; and means responsive to said desired gas generator speed signals for selectively applying said first and second steady state nozzle position signals to said position error signal generating means.

10. The apparatus of claim 9 wherein said nozzle position error signal generating means further comprises:
   means for generating signals commensurate with the desired nozzle position during acceleration and deceleration;
   means for selectively generating signals commensurate with the desired nozzle position during retard operation; and
   means responsive to said selected steady state, retard and acceleration and deceleration desired nozzle position signals for passing the signal which calls for nozzle position closest to retard position to said position error signal generating means.

11. The apparatus of claim 6 wherein said nozzle position varying means comprises:
   a hydraulic servomechanism;
   a nozzle actuator connected to and operated by said servomechanism; and
   electrically operated valve means for controlling said servomechanism in response to nozzle position error signals.

12. The apparatus of claim 10 wherein said nozzle position varying means comprises:
   a hydraulic servomechanism;
   a nozzle actuator connected to and operated by said servomechanism;
   electrically operated valve means for controlling said servomechanism in response to nozzle position error signals.

13. The apparatus of claim 8 wherein said fuel metering valve adjusting means comprises:
   means for sensing the position of the fuel flow controlling element in said metering valve and for generating a signal commensurate therewith;
   means responsive to said signal commensurate with metering valve element position and to the signal passed by said selector means for generating a fuel flow error signal;
   means for varying the position of said valve element; and
   means for applying said fuel flow error signal to said valve element position varying means.

14. The fuel control of claim 13 further comprising:
   means for sensing the engine gas generator compressor gas discharge pressure and for generating a signal commensurate therewith;
   means responsive to said compressor discharge pressure signal for generating a minimum fuel flow commensurate with instantaneous pressure;
   means responsive to said minimum fuel flow signal and to the fuel flow signal passed by said selector means for passing the signal calling for the most fuel flow to said valve adjusting means.

15. The apparatus of claim 14 further comprising:
   a starting circuit for delivering fuel to said engine upon start up, said starting circuit bypassing said metering valve; and
   means for disabling said starting circuit when said engine is started.

16. A nozzle control for a variable geometry free turbine engine, said engine having a variable area power turbine inlet nozzle and a gas generator section, said control comprising:
   means for varying the area of said nozzle, said nozzle area varying means operating in response to nozzle area error signals;
   means for generating a first desired nozzle area signal commensurate with engine starting requirements;
   means for sensing speed of said engine gas generator and for generating a signal commensurate therewith;
   means for generating signals commensurate with desired gas generator speed;
   means responsive to said signals commensurate with actual and desired gas generator speed for generating a speed error signal;
   means responsive to said gas generator speed error signal for generating an output signal when said speed error signal exceeds a predetermine magnitude, said output signal being commensurate with desired nozzle area during acceleration and deceleration;
   means responsive to sensed engine operating parameters for generating signals commensurate with the desired steady state nozzle area;
   means responsive to said steady state, start and acceleration and deceleration desired nozzle area signals for selecting and passing the nozzle area signal commensurate with maximum area;
   means for sensing actual nozzle area and for generating a signal commensurate therewith; and
   means responsive to said actual and selected desired nozzle area signals for generating nozzle area error signals for application to said nozzle area varying means.

* * * * *